US010782942B1

(12) United States Patent
Trost et al.

(10) Patent No.: US 10,782,942 B1
(45) Date of Patent: Sep. 22, 2020

(54) RAPID ONBOARDING OF DATA FROM DIVERSE DATA SOURCES INTO STANDARDIZED OBJECTS WITH PARSER AND UNIT TEST GENERATION

(71) Applicant: Capital One Services, LLC, McLean, VA (US)

(72) Inventors: Jason Trost, Atlanta, GA (US); Peter Godofsky, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/570,560

(22) Filed: Sep. 13, 2019

(51) Int. Cl.
| G06F 8/00 | (2018.01) |
| G06F 8/30 | (2018.01) |
| G06F 16/21 | (2019.01) |
| G06F 16/25 | (2019.01) |
| G06F 11/36 | (2006.01) |
| G06F 8/41 | (2018.01) |
| G06F 9/445 | (2018.01) |
| G06F 9/448 | (2018.01) |
| G06F 8/40 | (2018.01) |
| G06F 16/28 | (2019.01) |
| G06F 40/226 | (2020.01) |

(52) U.S. Cl.
CPC .............. G06F 8/37 (2013.01); G06F 8/40 (2013.01); G06F 8/427 (2013.01); G06F 8/437 (2013.01); G06F 9/4493 (2018.02); G06F 9/44589 (2013.01); G06F 11/36 (2013.01); G06F 16/212 (2019.01); G06F 16/258 (2019.01); G06F 16/284 (2019.01); G06F 40/226 (2020.01)

(58) Field of Classification Search
CPC ..... G06F 8/20; G06F 8/24; G06F 8/30; G06F 8/315; G06F 8/41; G06F 8/427; G06F 8/437; G06F 8/443; G06F 8/76; G06F 9/4488; G06F 9/44899; G06F 9/449; G06F 9/4493; G06F 11/36; G06F 11/3688; G06F 16/258; G06F 16/212; G06F 16/284; G06F 16/289
See application file for complete search history.

(56) References Cited

U.S. PATENT DOCUMENTS

| 6,041,330 A * | 3/2000 | Carman .................... G06F 8/78 |
| 6,418,543 B1 * | 7/2002 | Goli .................... G06F 11/3688 |
| | | 714/38.1 |
| 2002/0078216 A1 * | 6/2002 | Pankovcin ............ G06F 16/258 |
| | | 709/230 |
| 2002/0111793 A1 * | 8/2002 | Luo ........................ G06F 40/216 |
| | | 704/10 |

(Continued)

*Primary Examiner* — Diedra McQuitery

(57) ABSTRACT

Exemplary embodiments may provide an automated approach for processing an input data sample to yield a set of object classes, a parser and one or more unit tests for input data that is to be integrated into a data lake. The objects may be readily queried and, in some instances, may be Plain Old Java Objects (POJO's). The exemplary embodiments may process an input data sample to better understand the format of the input data. The input sample may be processed to identify entities, such as records, objects or the like, in the input data sample. The input data sample may be processed on a line by line basis to identify fields in the entities. Once the format of the input data is determined from the input data sample, a parser may be generated to parse the input data.

12 Claims, 13 Drawing Sheets

(56) References Cited

U.S. PATENT DOCUMENTS

| | | | | |
|---|---|---|---|---|
| 2006/0280178 A1* | 12/2006 | Miller | ............... | H04L 43/18 |
| | | | | 370/389 |
| 2010/0100872 A1* | 4/2010 | Mitra | ............ | G06F 11/3688 |
| | | | | 717/125 |
| 2011/0258601 A1* | 10/2011 | Ndem | ............ | G06F 11/3676 |
| | | | | 717/124 |
| 2012/0197887 A1* | 8/2012 | Anderson | ...... | G06F 16/2365 |
| | | | | 707/736 |
| 2012/0227028 A1* | 9/2012 | Pun | ............. | G06F 8/38 |
| | | | | 717/108 |
| 2013/0318503 A1* | 11/2013 | Li | ............. | G06F 9/45529 |
| | | | | 717/126 |
| 2017/0116283 A1* | 4/2017 | Park | ............. | G06F 16/258 |
| 2017/0192758 A1* | 7/2017 | Apte | ............. | G06F 8/51 |

* cited by examiner

RAPID ONBOARDING OF DATA FROM DIVERSE DATA SOURCES INTO STANDARDIZED OBJECTS WITH PARSER AND UNIT TEST GENERATION

BACKGROUND

It is challenging to integrate large amounts of data from diverse data sources into a data lake. The types of data that must be integrated may vary significantly, and the knowledge regarding the data format being integrated may be limited. Conventionally, this task is handled manually and requires discerning the data formats of the incoming data and the manual creation of objects in appropriate formats for holding the incoming data. This is a time-consuming task and may take a substantial number of man hours to perform. Given that often there is an ongoing need to integrate new data into the data lake, this process is inordinately time consuming.

SUMMARY

In accordance with an exemplary embodiment, a method is performed by a computing device having one or more processors. In this method, a sample of input data from a data source containing entities having fields is received at the computing device. A number of steps are performed by one or more processors of the computing device. These steps include processing at least a portion of the received sample of input data to identify the fields of one of the entities contained therein. In addition, a data type is determined for each identified field. A determination is made whether each identified field is mandatory or optional. A profile is built that contains information regarding the identified fields, the determined data types for the fields and whether the fields are mandatory or optional. An object class is generated for the entities based on the profile to hold data for the identified fields of the determined data types. Program code is generated where the program code is executable for parsing the sample of input data to add data from the input sample to the fields of an instance of the generated object class. At least one unit test for the generated program code may be generated to determine whether the generated program code works properly.

The method may include performing the unit test on the input data to determine whether the generated program code works properly. The method may also include receiving configuration information regarding at least one of the generated object class and/or the generated at least one unit test.

The entities may be one of objects, records, log entries, or messages. The profile may further contain information regarding how often a field appears in the entities. The information regarding how often a field appears in the entities of the sample of input data may be used to determine whether the field is optional or mandatory.

In accordance with an exemplary embodiment, a non-transitory computer-readable storage medium stores instructions for execution by one or more processors. The instructions include instructions for processing a data sample line by line to identify fields of records in the processed lines. The instructions also include ones for gathering metadata regarding each identified field and using the metadata regarding the fields to generate record metadata. The stored instructions include instructions for creating an object class for the record from the generated record metadata and instructions for instantiating an instance of the object class to hold data from the data sample. The instructions further include ones for generating at least one unit test for testing the parser.

The metadata regarding each identified field may include data type. The medium may further store instructions for generating a parser based on the record metadata for parsing data and may further store instructions for executing the at least one unit test. The stored instructions may include instructions for generating multiple unit tests for testing the parser. The object class for the records may specify fields and may specify at least one field as optional. The meta data regarding the fields may specify a level of nesting for the field.

In accordance with an exemplary embodiment, a method is performed by a computing device having one or more processors and a storage. Per the method, a sample of data having constructs that may contain one or more fields is parsed to identify the constructs and the fields, wherein a selected one of the constructs contains a nested construct. For each field, information is stored in the storage regarding a degree of nesting of the field, and information is stored in the storage regarding a data type of the field. The information regarding the degree of nesting of the field and the information regarding the data type of the field for the fields are used to generate an object class for the constructs to accommodate nesting of the identified constructs. Code is generated for a parser of the constructs based on generated object class and the stored information. The parser accounts for nesting of the constructs.

The method may include generating at least one unit test for the parser. In addition, the method may include determining that a selected one of the fields is mandatory if the selected field appears in all constructs in the sample. The selected field may be designated as mandatory in the generated object class. It may be determined that a given one of the fields is optional if the given field is not in all of the constructs in the sample. The given field may be as optional in the generated object class.

DETAILED DESCRIPTION

Exemplary embodiments described herein may provide an automated approach for processing an input data sample to yield a set of object classes, a parser and one or more unit tests for input data that is to be integrated into a data lake. The objects may be readily queried and, in some instances, may be Plain Old Java Objects (POJO's). The exemplary embodiments may integrate the input data more quickly than conventional approaches. The exemplary embodiments may integrate a wide variety of types of input data.

The exemplary embodiments may process an input data sample to better understand the format of the input data. A large input data sample may yield better results than a small input data sample. The input sample may be processed to identify entities, such as records, objects or the like, in the input data sample. The input data sample may be processed on a line by line basis to identify fields in the entities. The exemplary embodiments may identify what fields are mandatory and what fields are optional by identifying fields that appear in every instance of an entity as mandatory and conversely by identifying fields that do not as optional. An object class may be defined for each variety of entity, and fields may be designated as mandatory or optional in the object class.

Once the format of the input data is determined from the input data sample, a parser may be generated to parse the input data. The parsed input data may be stored in instances of the defined object classes for the entities. One or more unit tests may be generated to ensure that the parser is properly parsing the input data. The knowledge of the format of the input data may be used to generate the one or more unit tests.

The approach of the described exemplary embodiments provides a generalized solution to handle a wide range of input data types. The approach may learn the format of previously unencountered data types to properly integrate the input data into the data lake.

Figure 1:
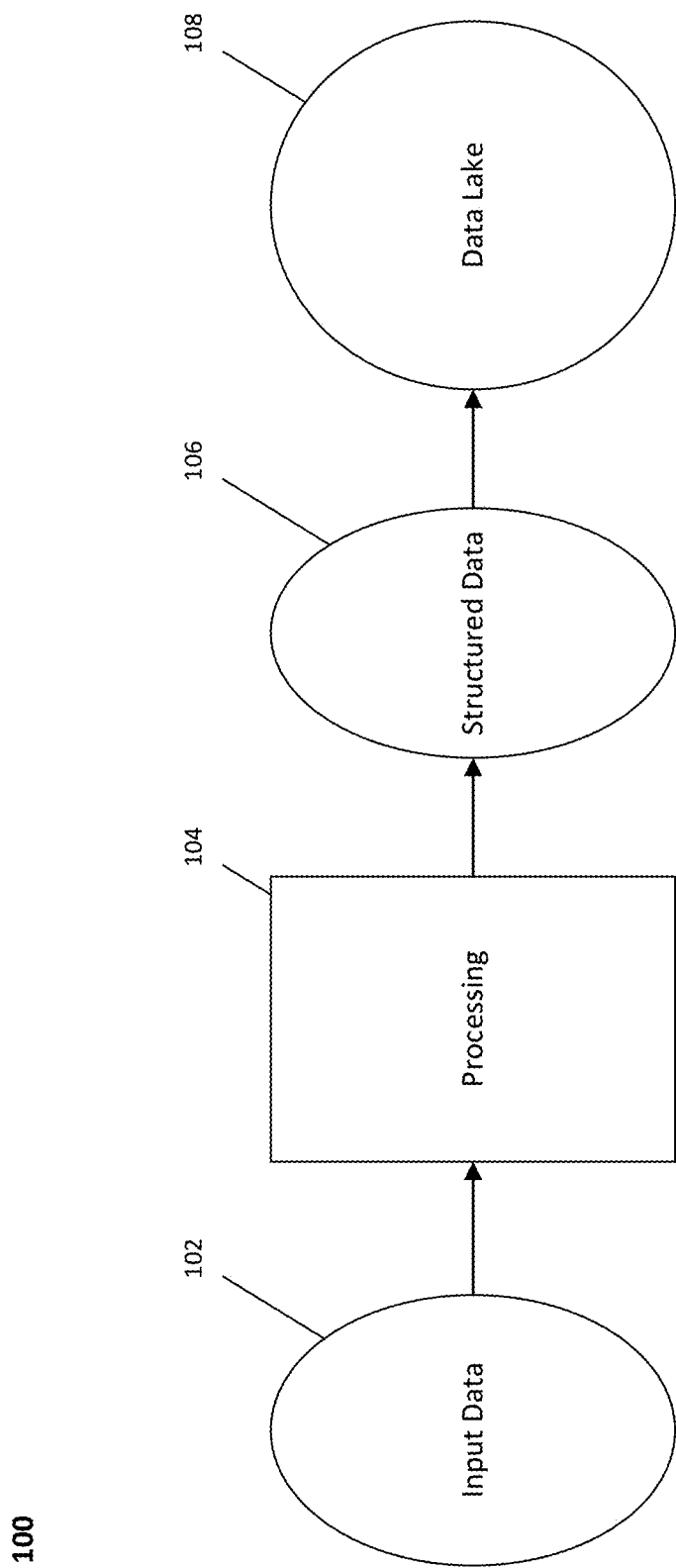
FIG. 1 depicts flow of data into the data lake in an exemplary embodiment.

FIG. 1 depicts a diagram 100 illustrating the general flow of data in an exemplary embodiment. The input data 102 is to be integrated into the data lake 108. The input data 102 may take different forms. For instance, the input data 102 may hold log data from application logs or systems logs. The input data 102 may include streams of messages and may hold a combination of data and text. The input data 102 may be in any of a number of different formats, such as JavaScript Object Notation (JSON), eXtensible Markup Language (XML) or in other formats.

The input data 102 is subjected to processing 104 as will be described in more detail below. The processing 104 in exemplary embodiments may take input data sample to learn the format of the input data 102 and to define objects and/or other structures suitable for holding the input data and suitable for querying. The processing 104 may result in structured data 106, such as the POJO objects mentioned above, that may be integrated into the data lake 108. The data lake 108 may include one or more databases with a database management system or other variety of object store or structured data store.

Figure 2:
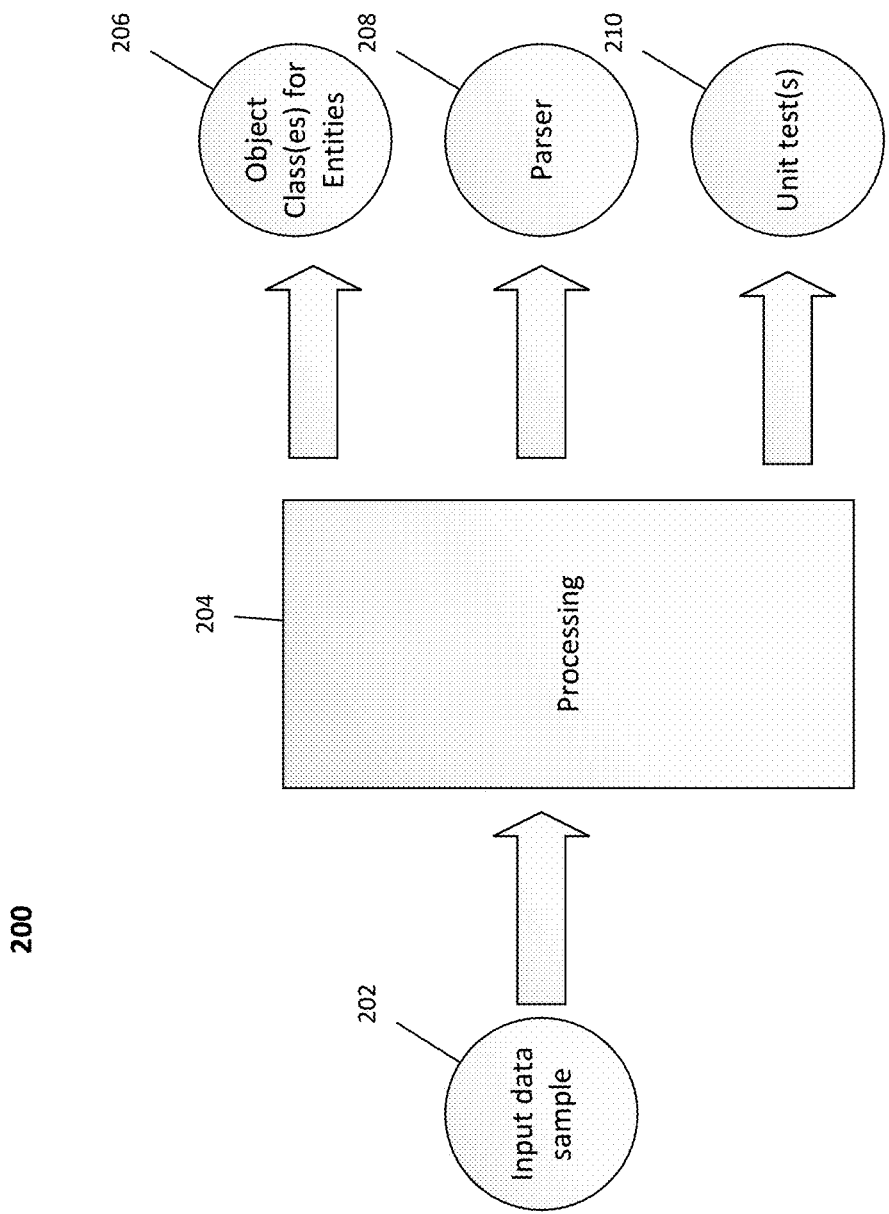
FIG. 2 depicts the generation of object classes, one or more unit tests and a parser from an input data sample in an exemplary embodiment.

FIG. 2 depicts a diagram 200 illustrating use of the input data sample 202 in processing. As was mentioned above, the input data sample 202 is obtained to attempt to learn the format of the input data. It may be helpful for the input data sample 102 to be sufficiently large to include the different data formats found in the input data. Small samples may not include a sufficient variety of the data formats found in the input data. The input data sample is subject to processing 204 to yield object classes for the entities 206, a parser 208 for parsing the input data and one or more unit tests 210. Configuration information may specify how many unit tests to generate. As will be elaborated on in more detail below, once the format of the input data is known, a parser to parse that input data may be determined and generated and unit tests may be defined.

Figure 3:
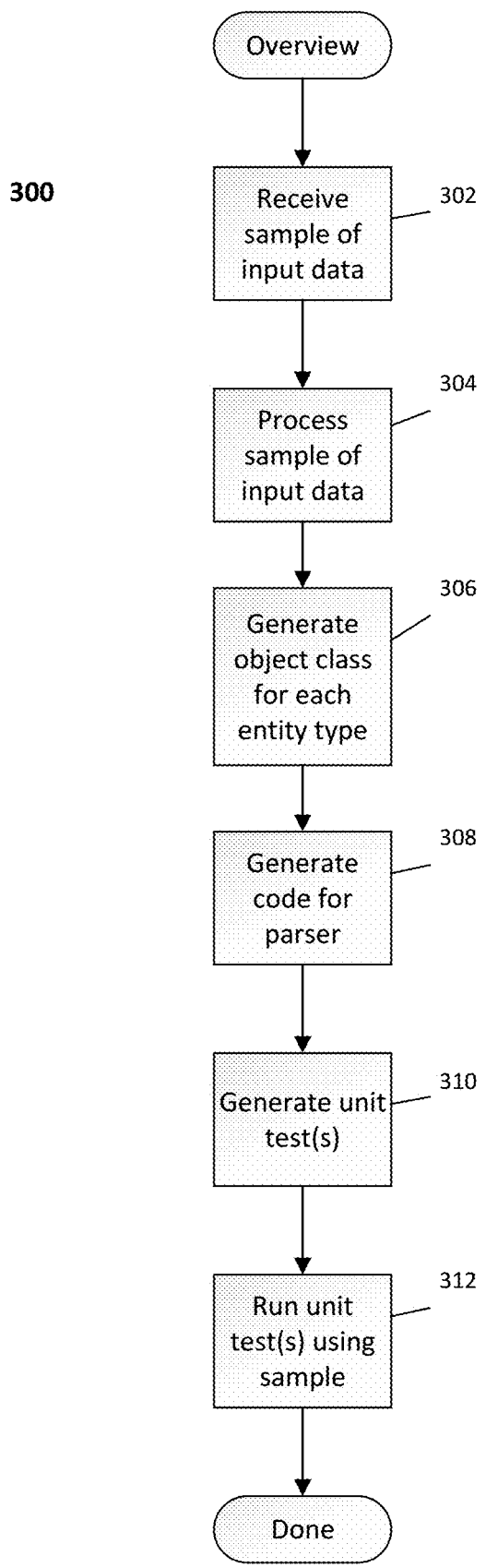
FIG. 3 depicts a flowchart showing steps that may be performed in processing the of input data sample in an exemplary embodiment.

FIG. 3 shows a flowchart of steps that may be performed in the processing 204. Initially, the input data sample is received (302). The input data sample is taken from the input data. This input data sample is then processed (304). This processing generates an object class for each entity type (306). The object class may be defined in any of a number of different programming languages, but the objects classes may be defined in Java to define POJO object classes in some embodiments. The processing generates the object classes to accommodate the entities and fields encountered in the input data sample. The processing also generates a parser (308) for parsing the input data based on the knowledge gained regarding the input data by processing the input data sample. The processing generates code based on the structure of the POJO objects and the parsing logic to be applied. In some embodiments a series of Jinga (a web template engine) templates written in the Python programming language may be used to generate the parser code. One or more unit tests are also generated (310) for testing the parser. The unit tests may be generated in some embodiments by Jinga templates in the Python language that generate unit test functions with Python assert statements. The unit tests are generated in view of the known information regarding the structure of the input data gained from processing the input data sample. The unit tests may then be run on the input data sample (312) to test whether the parser properly parses the input data in the input data sample.

Figure 4:
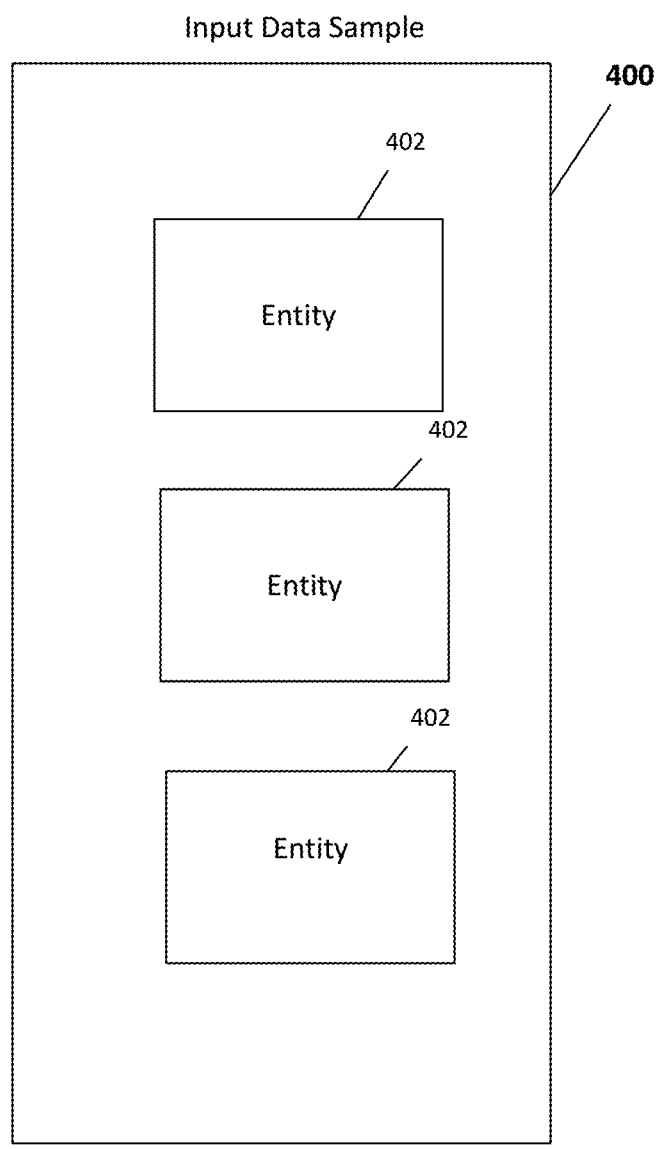
FIG. 4 depicts a flowchart showing steps that may be performed in the line by line processing of the input data sample in an exemplary embodiment.
Figure 5:
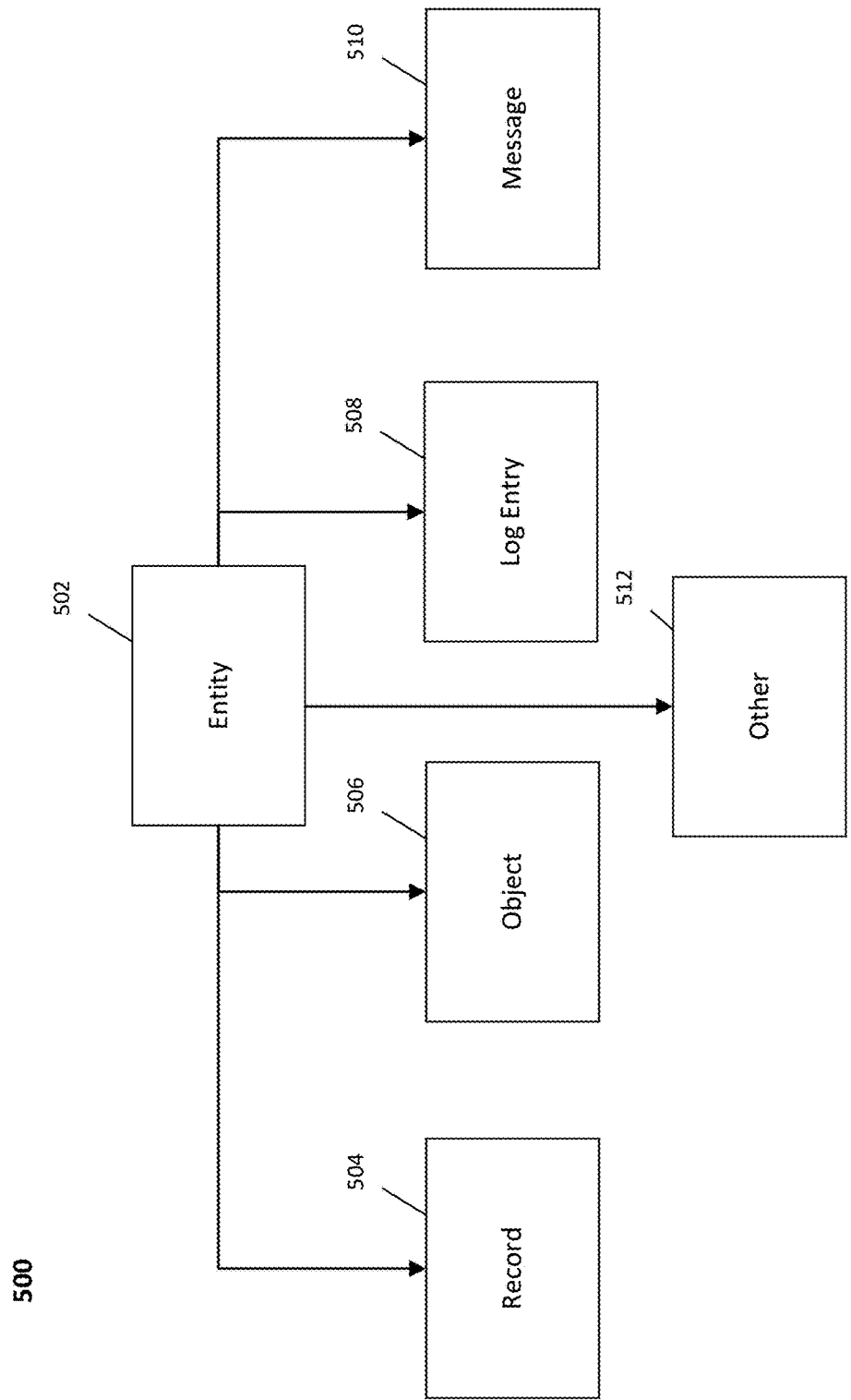
FIG. 5 depicts an illustrative format of an input data sample.

FIG. 4 shows a block diagram of a simplified view of the input data sample 400. The input data sample 400 is composed of entities 402. The entities may be of different forms depending on the nature of the input data. As shown in the diagram 500 of FIG. 5, an entity 502 may be a record 504, such as a record extracted from an application log or other system log. Alternatively, the entity may be an object 506, such as found in a JSON file or other types of object-oriented content. The entity may be a log entry 508 or a message 510. The entity may instead be another type of entity 512.

Figure 6:
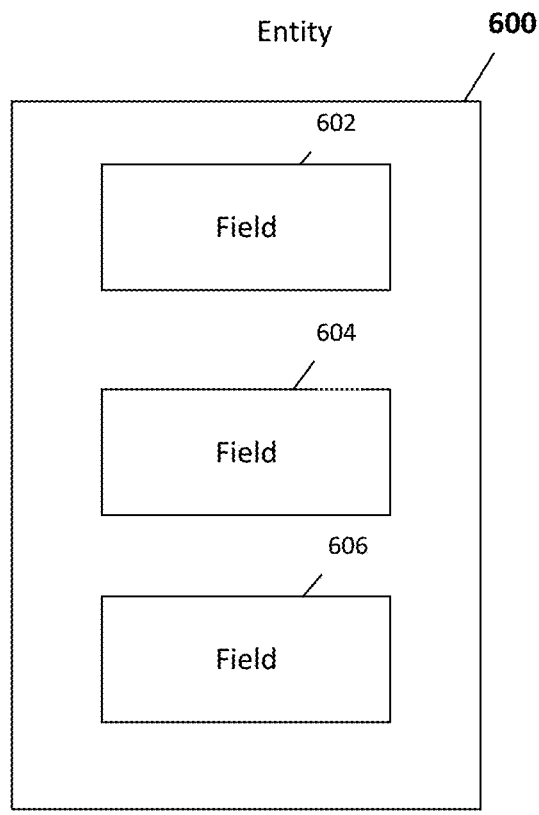
FIG. 6 depicts illustrative types of entities.

As shown in FIG. 6, each entity 600 may include one or more fields 602, 064 and 606. The fields may hold content for the entity. For example, suppose that the entity is a record for a person. There may be separate fields for name, age and gender.

Figure 7:
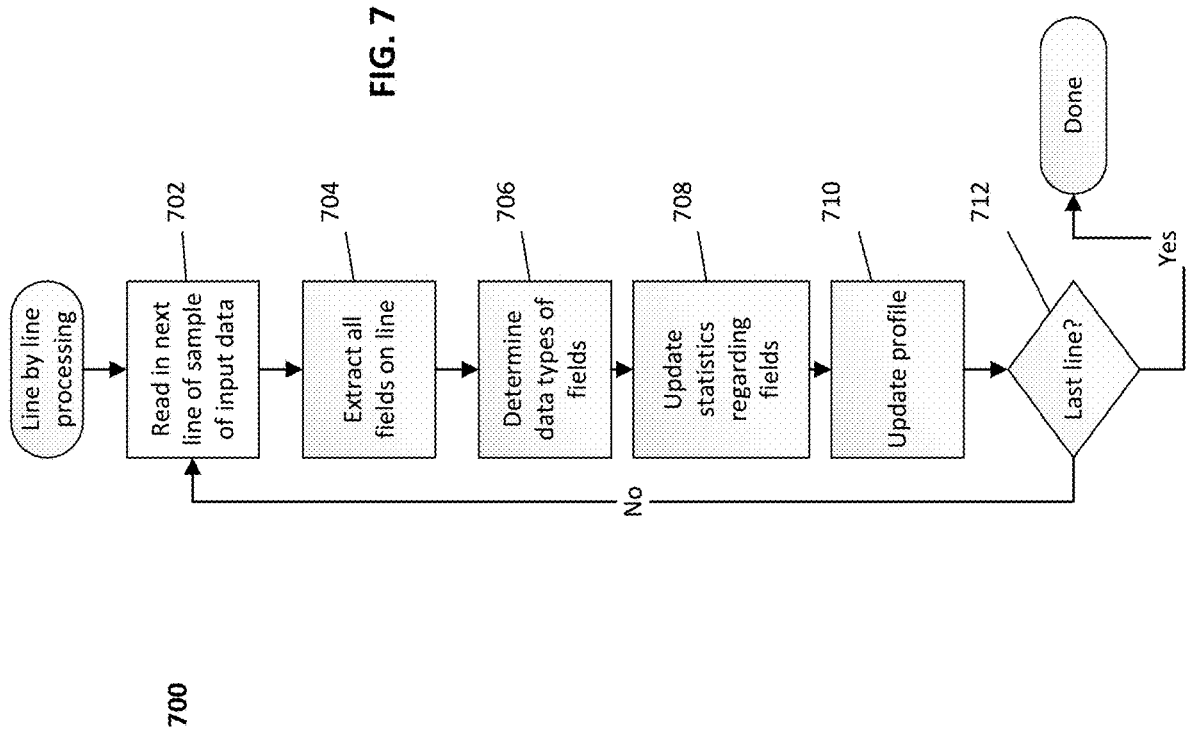
FIG. 7 depicts an illustrative format of an entity.

The processing 304 of the input data sample may be performed on a line by line basis. FIG. 7 provides a flowchart 700 of steps that may be performed in such processing. A next line in the input data sample is read in for processing (702). The processing then attempts to extract all fields in the line (704). This may entail locating delimiters that delimit fields or being some possession of the rough format of the entities. For instance, if the input data sample is part of an XML file, the syntax of an XML file is known and may be leveraged. Similarly, if the input data sample is part of a JSON file, the syntax may be known. A parser particular to the file format or a general parser of regular expressions may be used.

The extracted fields are analyzed to determine their data type (706). In particular, the fields may be compared to regular expressions for known data types and if there is a match, the field may be assigned the matching data type. This information may be stored in a profile as will be described in more detail below. If the file type of the input data sample is known, information regarding the file format may be leveraged to help determine data types. Examples of data types include numbers, IP addresses, dates, URLs, text, Booleans, etc. Statistics may be gathered regarding the fields (708). For instance, the number of times a field occurs may be counted and stored in the profile. What line a field appears in may also be noted and stored in the profile. When the end of the line is reached, the profile may be updated (710). Alternatively, the profile may be updated on an ongoing basis during the processing of a line. If the last one of the input data samples has been reached (712), the processing is complete. Otherwise, the processing continues as described above beginning again at 702 for the next line.

Figure 8:
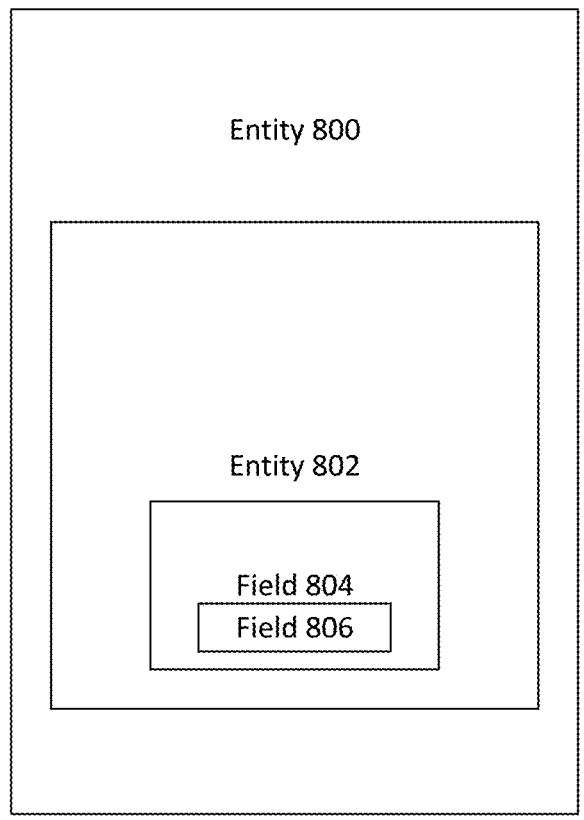
FIG. 8 depicts an illustrative nesting of fields and entities.

The processing is able to account for nesting of entities and/or fields. FIG. 8 shows an example of such nesting. In the example shown in FIG. 8, an entity 800 includes a nested entity 802. The nested entity includes field 804 and nested field 806. The exemplary embodiments may store a level value in the profile for each entity and field. The level value specifies the degree of nesting of the entity and field. This information is useful in constructing the objects for the entities and defining the fields for such entities.

Figure 9:
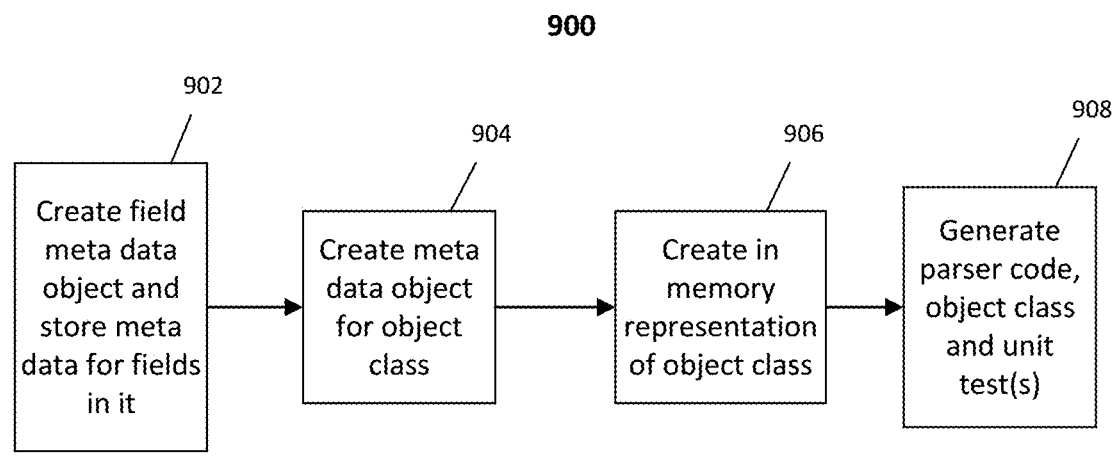
FIG. 9 depicts stages that may be followed to generate objects, a parser and one or more unit tests from an input data sample in an exemplary embodiment.

FIG. 9 shows a diagram 900 of the interrelationship between data constructs and the like used and produced in the processing of the input data sample. The data constructs may be part of the profile that is generated in processing the input data sample. As the line by line processing of the input data sample proceeds, a field meta data object is defined to store meta data regarding the fields (902). This field meta data object may hold information such as the name of the field, whether the field is optional, data type, format information and the like. A meta data object for the object class of an entity is defined to hold meta data (904). This may include information such as what fields are in an object of the specified object class, is there any nesting, etc. This meta data object is intended to hold meta data that may be used to define an object class for the entity. Hence, next in memory representations of the POJOs for the entity are defined (906). This may hold information such as how many times a field has appeared, data type, line number in the input log, record number, value and format for a particular field instance. Lastly, the parser is generated using the information that has been obtained regarding the POJOs, the object class is defined, and the unit tests are created (908).

Figure 10:
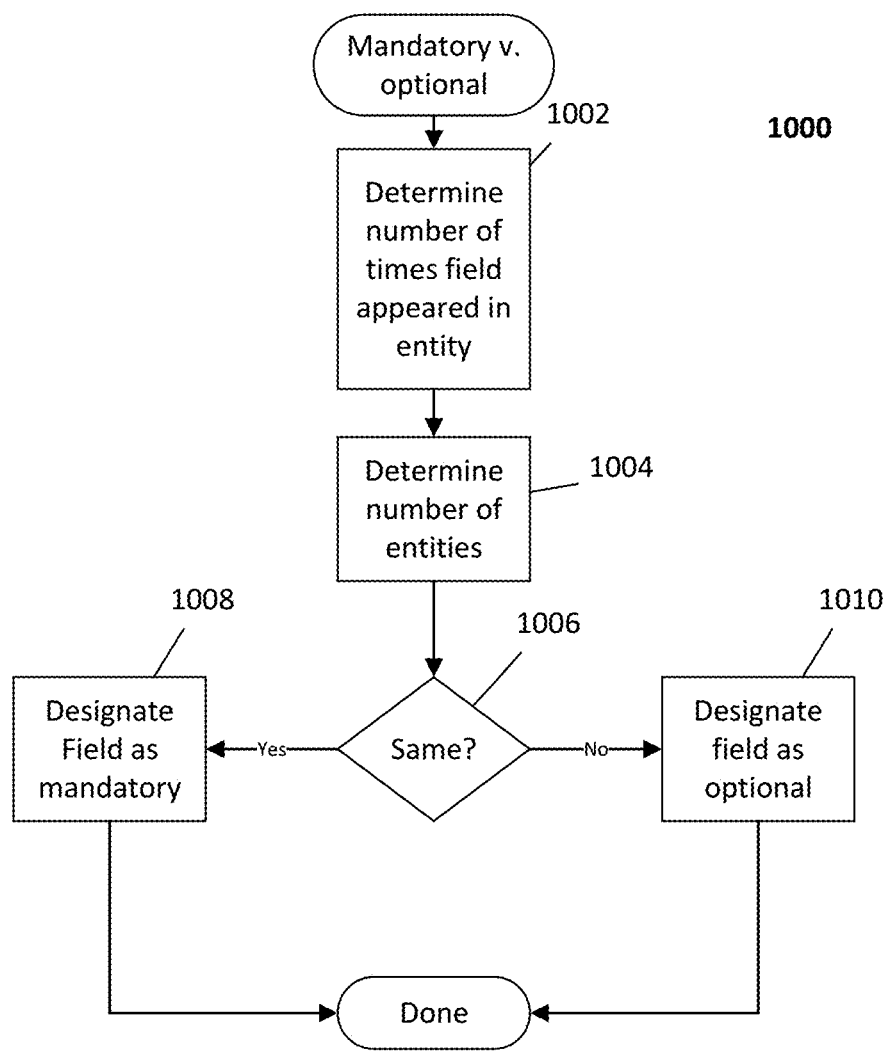
FIG. 10 depicts a flowchart showing steps that may be performed to determine if a field is optional or mandatory in an exemplary embodiment.
Figure 11:
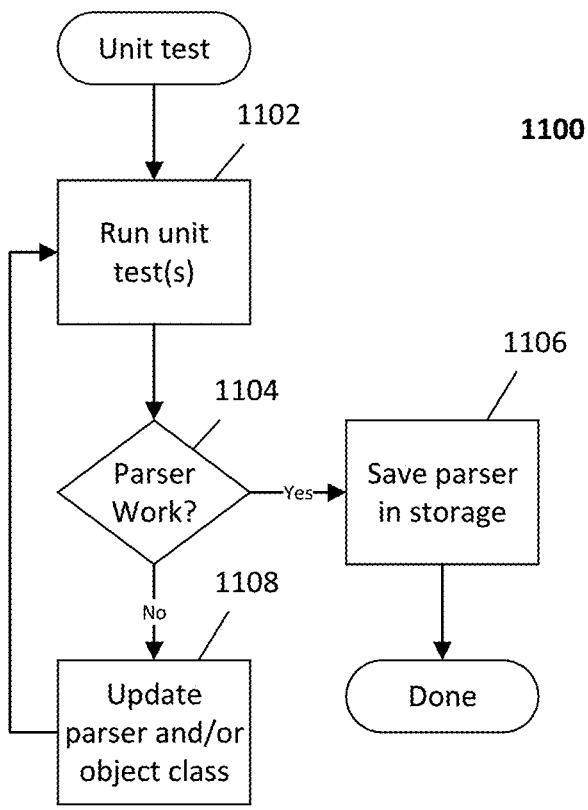
FIG. 11 depicts a flowchart showing steps that may be performed to generate a unit test in an exemplary embodiment.

In some embodiments, the fields may be designated as optional or mandatory in the object class for the entity based on the processing on the input data sample. FIG. 10 provides a flowchart 1000 of the steps that may be performed to make such a determination. A determination is made regarding how many times a field appeared hi an entity in the input data sample (1002). A determination is also made of how many entities were in the input data sample (1004). If these values are the same (1006), it means that the field appeared in each entity and the field is designated as mandatory (1008). If the values are not the same (1006), the field did not appear in each entity and is designated as optional (1010). The field is defined in the object class as mandatory or optional. This analysis is performed for each field.

As was mentioned above, a unit test or multiple units test may be generated based on the configuration information. FIG. 1100 provides a flowchart 1100 of steps that may be performed regarding the generated unit test(s). The unit test(s) are run on the input data sample to see if the parser properly parses the input data (1102). An example of input data for a given field may be parsed by the parser as part of the unit test. A check can then be made whether the parser worked or not (1104). This may be repeated across multiple instance of fields in the input data sample. If the parser worked properly, the parser may be stored in storage for use in parsing the input data (1106). If the parser did not work, the parser and/or the object class definition may be updated to correct the error in parsing with the parser (1108). The unit test(s) may then be rerun (1102) and the process repeated until a satisfactory parser is obtained.

Figure 12:
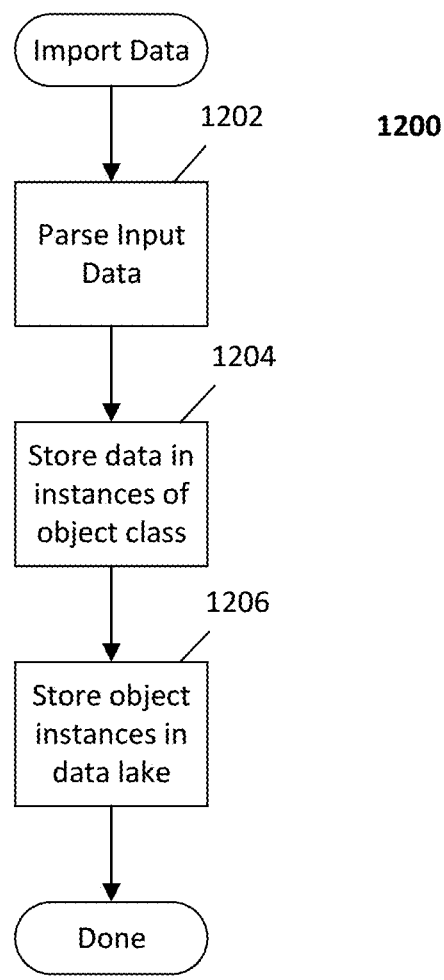
FIG. 12 depicts a flowchart of steps that may be performed to import data in an exemplary embodiment.

Once a satisfactory parser has been obtained, the parser may be used on the input data. FIG. 12 shows a flowchart 1200 of the steps that may then be performed. First, the input data may be parsed with the parser (1202). The parsed data may be stored in object instances of the POJOs for the entity object class (1204). The object instances may then be stored in the data lake (1206).

Figure 13:
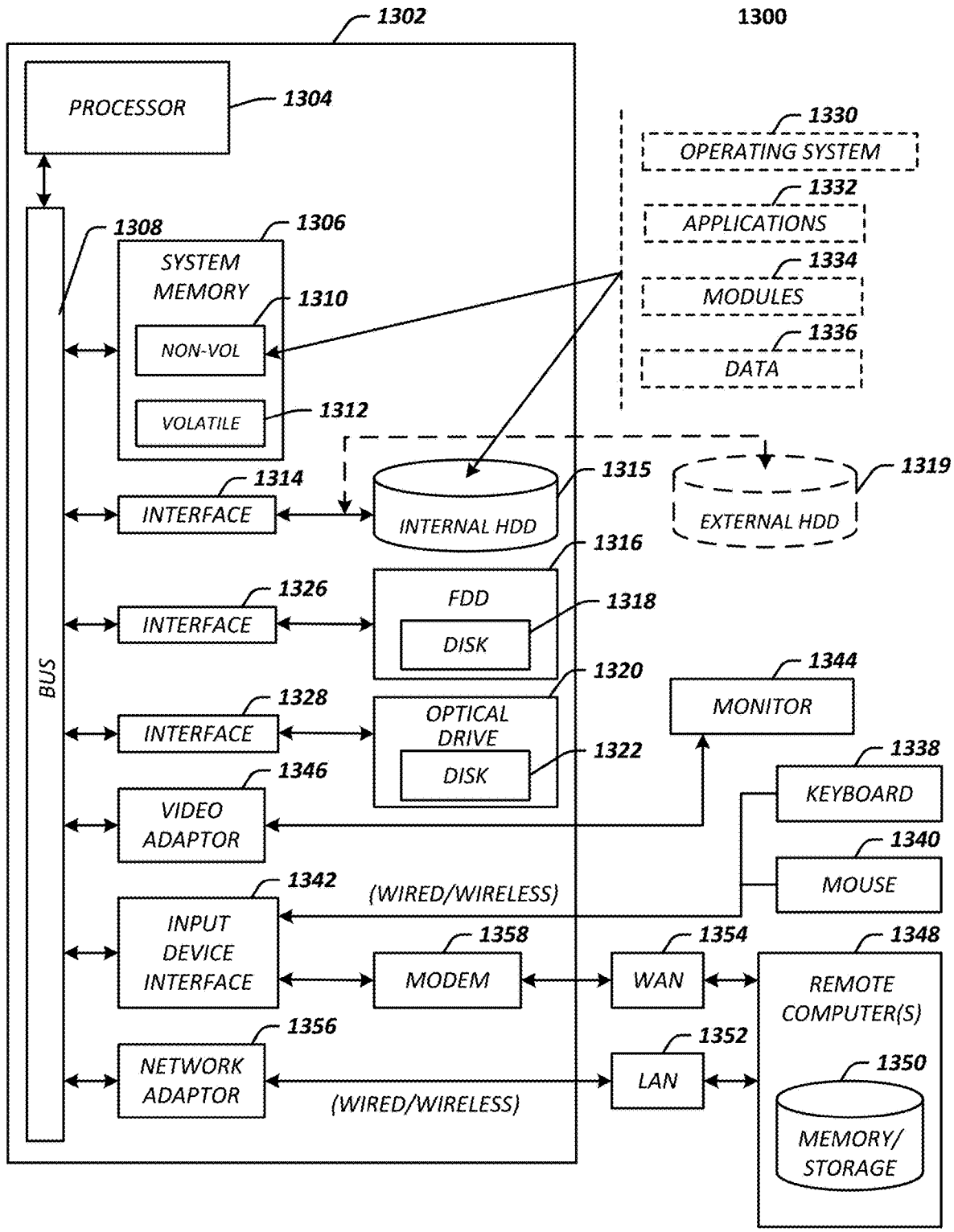
FIG. 13 depicts a block diagram of an illustrative computing environment for practicing an exemplary embodiment.

The methods described herein may be performed by a computing environment 1300, such as that depicted in FIG. 13. FIG. 13 illustrates an embodiment of an exemplary computing environment 1300 that includes a computing device 1302 that may be suitable for implementing various embodiments as previously described. In various embodiments, the computing environment 1300 may comprise or be implemented as part of an electronic device. More generally, the computing environment 130000 is configured to implement all logic, applications, systems, methods, apparatuses, and functionality described herein with reference to FIGS. 1-12.

As used in this application, the terms "system" and "component" and "module" are intended to refer to a computer-related entity, either hardware, a combination of hardware and software, software, or software in execution, examples of which are provided by the exemplary computing environment 1300. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing device 1302 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing device 1302.

As shown in FIG. 13, the computing device 1302 includes a processor 1304, a system memory 1306 and a system bus 1308. The processor 1304 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multiprocessor architectures may also be employed as the processor 804.

The system bus 1308 provides an interface for system components including, but not limited to, the system memory 1306 to the processor 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computing device 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies. The computing device 1302 is generally is configured to implement all logic, systems, methods, apparatuses, and functionality described herein with reference to FIGS. 1-12.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the system A user can enter commands and information into the computing device 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1304 through an input device interface 1342 that is coupled to the system bus 1308 but can be connected by other interfaces such as a parallel port, IEEE 1394 serial port, a game port, a USB port, an IR interface, and so forth.

A monitor 1344 or other type of display device is also connected to the system bus 808 via an interface, such as a video adaptor 1346. The monitor 1344 may be internal or external to the computing device 1302. In addition to the monitor 1344, a computer typically includes other peripheral output devices, such as speakers, printers, and so forth.

The computing system 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computing system 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computing device 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computing device 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computing device 1302, or portions thereof, can be stored in the remote memory/storage device 1350. It will be appreciated that the network connections shown are exemplary and other means of establishing a communications link between the computers can be used.

The computing device 1302 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method performed by a computing device having one or more processors, the method, comprising:
   receiving at the computing device a sample of input data from a data source containing entities having fields;
   with the one or more processors:
      processing at least a portion of the received sample of input data to identify the fields of a plurality of the entities contained therein, the processing proceeding on a line by line basis for the portion of the received sample;
      determining a data type for each identified field;
      determining whether each identified field is mandatory or optional;
      building a profile containing information regarding the identified fields, the determined data types for the fields and whether the fields are mandatory or optional, wherein the profile is updated on an ongoing basis as processing of each line occurs;
      generating an object class for the entities based on the profile to hold data for the identified fields of the determined data types; and
      generating program code that is executable for parsing the sample of input data to add data from the input sample to the fields of an instance of the generated object class.

2. The method of claim 1, further comprising generating and performing a unit test on the input data to determine whether the generated program code works properly.

3. The method of claim 1, wherein the entities are one of objects, records, log entries, or messages.

4. The method of claim 1, further comprising receiving configuration information regarding at least one of the generated object class.

5. The method of claim 4, wherein the profile further contains information regarding how often a field appears in the entities.

6. The method of claim 5, wherein the information regarding how often a field appears in the entities of the sample of input data is used to determine whether the field is optional or mandatory.

7. A non-transitory computer-readable storage medium storing instructions for execution by one or more processors for performing the following:
processing a data sample line by line to identify fields of records in the processed lines;
gathering metadata regarding each identified field;
using the metadata regarding the fields to generate record metadata;
from the generated record metadata, creating an object class for the record; and
instantiating an instance of the object class to hold data from the data sample; and
generating at least one unit test for testing a parser; and
where the parser fails a unit test of the at least one unit test, updating the parser and/or an object class definition for the object class for the record to correct an error in parsing with the parser.

8. The non-transitory computer-readable storage medium of claim 7, wherein the metadata regarding each identified field includes data type.

9. The non-transitory computer-readable storage medium of claim 7, further storing instructions for generating a parser based on the record metadata for parsing data.

10. The non-transitory computer-readable storage medium of claim 7, wherein the stored instructions include instructions for generating multiple unit tests for testing the parser.

11. The non-transitory computer-readable storage medium of claim 7, wherein the object class for the record specifies fields and specifies at least one field as optional.

12. The non-transitory computer-readable storage medium of claim 7, wherein the meta data regarding the fields specifies a level of nesting for the field.

* * * * *